United States Patent [19]

Wilansky

[11] 4,107,050
[45] Aug. 15, 1978

[54] FILTER CARTRIDGE

[75] Inventor: Harold Wilansky, Big Flats, N.Y.

[73] Assignee: The Hilliard Corporation, Elmira, N.Y.

[21] Appl. No.: 819,220

[22] Filed: Jul. 26, 1977

[51] Int. Cl.² ................ B01D 25/04; B01D 25/16
[52] U.S. Cl. .................... 210/492; 210/504; 210/505; 210/508
[58] Field of Search ........ 210/492, 483, 488, 503–506, 210/508

[56] References Cited

U.S. PATENT DOCUMENTS 2,856,076 10/1958 Whipple .................. 210/492
3,425,563 2/1969 Wilansky ................. 210/492

Primary Examiner—Frank Sever
Attorney, Agent, or Firm—William J. Simmons, Jr.

[57] ABSTRACT

An oil filter cartridge comprising filter discs and separator discs stacked alternately, the separator discs having inlet and outlet chambers walled in by the contiguous filter discs. The filter discs have inlet ports in registration with the inlet chambers for introducing unfiltered oil therein. The separator discs are provided with slots registering with the inlet ports of the filter discs. These slots, in combination with the adjacent inlet ports, provide enlarged inlet orifices which are not readily blocked by swelling of the material of the separator discs due to water-contaminated oil.

3 Claims, 4 Drawing Figures

U.S. Patent    Aug. 15, 1978    4,107,050

FILTER CARTRIDGE

BACKGROUND OF THE INVENTION

The present invention relates to a filter cartridge for removing suspended foreign matter from circulating lubricant, and more particularly, to that type of cartridge composed of a stack of filter discs with intercalated spacer discs forming a hollow cylindrical package through which the lubricant to be clarified is caused to flow in a radial or contra-radial direction, as described in U.S. Pat. No. 2,687,805 issued to E. H. Proulx on Aug. 31, 1954 and assigned to the assignee of the present invention.

The present invention is an improvement relating to the structures disclosed in U.S. Pat. No. 3,360,133 issued Dec. 26, 1967 to E. H. Proulx and in U.S. Pat. No. 3,425,563 issued Feb. 4, 1969 to H. Wilansky, both of which are assigned to the assignee of this application.

As pointed out in the above-identified Wilansky patent, the lubricant to be clarified may be contaminated with water. Such contamination may be the result of condensation of water vapor during periods of shut down or by leakage from the cooling system of an internal combustion engine or turbine due to a faulty gasket or the like.

The spacer discs usually comprise a mixture of cotton fibre and cellulose fibre which is coagulated from an aqueous vehicle. These fibres are of a hygroscopic nature, tending to absorb and retain any water entrained in the contaminated liquid. The water so absorbed swells and softens the spacer discs, causing their edge portions to expand into and clog the inlet ports in the filter discs. The consequent resistance to flow of lubricant into the cartridge causes the external pressure to build up and augment the intrusion of the softened portions of the spacer discs into the inlet ports of the filter discs until warping or wrinkling of the discs takes place, thereby opening radial passages between the discs and suddenly permitting substantially free flow of the lubricant, still loaded with accumulated sludge and grit. Such violent breakdown of the filter may occur at pressure drops as low as 40 p.s.i. differential. This occurrence can quickly have a disastrous effect on the bearing surfaces of the unit being lubricated.

In accordance with the teachings of the aforementioned Wilansky patent, wire staples inserted circumferentially in the separator discs in position to register with the inlet ports of he filter discs restrain the swelling and intrusion of the material of the separator discs at these critical areas. The aforementioned Proulx U.S. Pat. No. 3,360,133 teaches the use of wire stitch reinforcements of the filter discs bridging the outlet ports of the spacer discs to prevent channeling, a condition whereby pressure due to the buildup of solid particles in the intake cells causes portions of the filter discs to be forced into the outlet passages, thereby permitting unfiltered oil to pass directly through the cartridge.

The combined features of the above-described Proulx and Wilansky patents have resulted in filter cartridges in which the disruptive type of failure due to water-contaminated oil has been effectively prevented even when the pressure drop has been permitted to increase to as much as 100 p.s.i. differential. Although the performance of this type of filter cartridge has been exceptional under such adverse conditions as continued use after recommended maximum pressure has been reached and filtration of water-contaminated oil, it would be desirable to simplify the construction of the discs employed in such cartridges, thereby reducing the manufacturing cost and time.

SUMMARY OF THE INVENTION

It is therefore an object of the present invention to provide a filter cartridge which is economical in construction.

A further object is to provide a filter cartridge which is effective in operation over extended periods of use even when the liquid to be clarified is contaminated with entrained water.

Still another object is to provide such a filter cartridge incorporating means for preventing the portions of the spacer discs adjacent the inlet ports of the filter discs from clogging said inlet ports when softened by absorbed moisture.

Briefly, this invention relates to cartridges for filtering oily liquids which are contaminated with entrained immiscible material including water. Such filters conventionally comprise a plurality of filter discs and a plurality of interposed spacer discs of foraminous material. The spacer discs have circumfirentially arranged cut-out portions that form, along with the adjacent filter discs, alternately arranged inlet and outlet cells, the inlet cells having inlet passages. The filter discs have inlet ports in registration with the inlet passages of the spacer discs. The present invention comprises improved means for preventing the material of the spacer discs adjacent the inlet ports from clogging the inlet ports. More specifically, the spacer discs of the cartridge of the present invention are provided with a plurality of radially extending slots, each of which is aligned with the inlet ports of the filter discs. The combined effect of the disposition of a slot in the spacer disc aligned with two inlet ports in the adjacent filter discs is to enlarge each entrance port in a direction parallel to the axis of the cartridge so that the amount of swelling of the spacer material in the vicinity of the inlet ports due to the presence of water in the oily liquid will be insufficient to clog those ports. Moreover, the slots extend a sufficient distance radially along the inlet ports that a linear channel extends longitudinally through the cartridge and interconnects all inlet ports that are in longitudinal alignment.

DESCRIPTION OF THE PREFERRED EMBODIMENT

Figure 1:
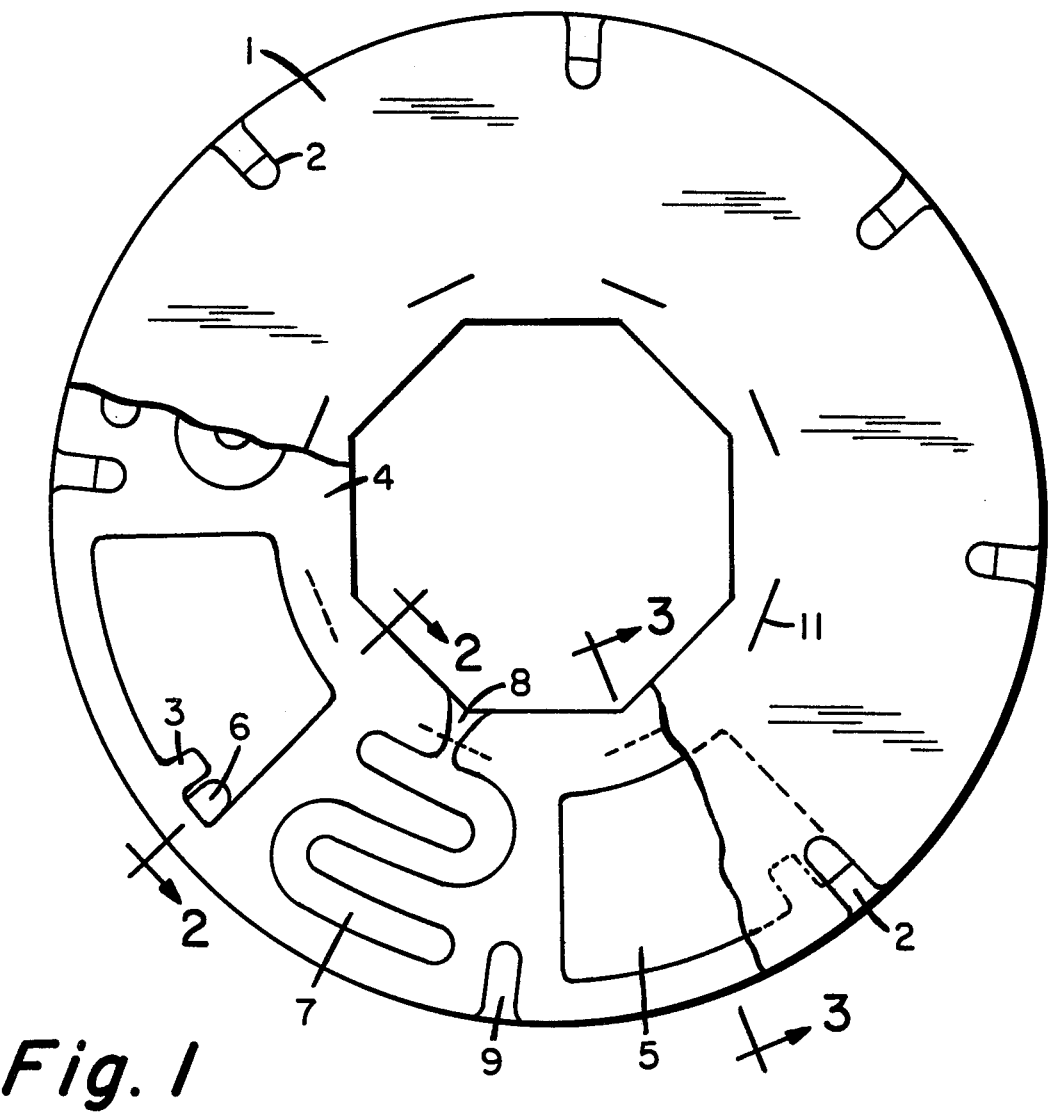
FIG. 1 is a top plan view of a stack of discs, the top filter disc being cut away to show a portion of the contiguous spacer disc and adjacent filter disc.
Figures 2, 3, 4:
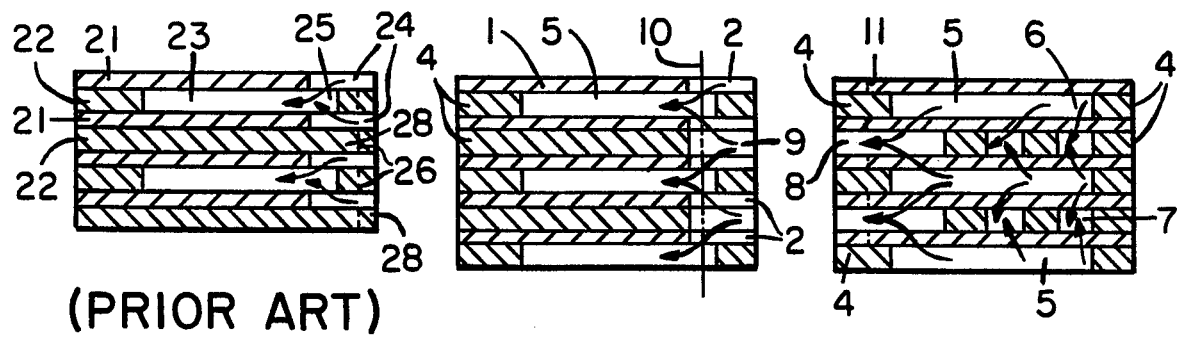
FIGS. 2 and 3 are cross-sectional views taken along lines 2—2 and 3—3, respectively, of FIG. 1.
FIG. 4 is a cross-sectional view of the inlet section of a prior art cartridge.

In FIGS. 1, 2 and 3 there is illustrated a filter cartridge comprising a series of filter discs 1 of suitable foraminous material, each such disc having a plurality of equally spaced inlet ports 2 extending radially inwardly from its periphery. As here shown there are eight inlet ports, and the inner boundary of the disc is octagonal to secure orientation of the discs when they are assembled on an octagonal assembly mandrel.

Contiguous annular spacer discs 4 are provided with four keystone shaped cut-out spaces which, when enclosed by the adjacent filter discs 1, form inlet cells or chambers 5 having inlet passages 6 registering with the inlet ports 2 of the filter discs. Each of the inlet passages 6 is situated between one of the inwardly extending tabs 3 and the adjacent wall of chamber 5. The spacer discs 4 are also provided with four sinuously shaped cut-out spaces forming, with the adjacent filter discs, outlet chambers or cells 7 having outlet passages 8. The inlet and outlet chambers are spaced alternately around the spacer discs 4, and the inner boundaries of the spacer discs are octagonal to secure proper orientation in assembly, each spacer disc being angularly displaced through 45° with respect to the next in the assembly.

In accordance with commercial practice, the filter discs and spacer discs can be composed of fibres of cotton, cellulose, synthetic material or the like, or from combinations thereof. The separator discs are commonly formed of a composition of cotton fibre and cellulose fibre. As previously stated, the fibres have an affinity for water, and if the liquid to be clarified is contaminated with water, this moisture will be selectively absorbed by the fibres. The material of the spacer discs is therefore caused to soften and swell, thereby tending to obstruct the inlet ports 2 and thus prevent the turbid liquid from entering the filter, with the undesirable results above pointed out.

The cartridge of the present invention incorporates improved means for preventing obstruction of the inlet ports. Such means comprises slots 9 which extent radially inwardly from the periphery of spacer discs 4 and are coextensive with slots 2 of the two adjacent filter discs. Thus, even if the material of the spacer discs swells in the regions adjacent to inlet ports 2, the composite inlet orifices comprising slots 9 and the adjacent inlet ports 2 are large enough to preclude any tendency for the material of the separator discs to swell and block the flow of oily liquid into chambers 5. The alignment of slots 9, inlet ports 2 and inlet passages 6 creates a linear passage, the axis of which is represented by broken line 10 of FIG. 2. In the illustrated embodiment, eight of these linear passages extend longitudinally through the cartridge. If any inlet port becomes clogged, oily liquid can flow from another inlet port and through the respective linear passage to that chamber 5 which would have been supplied by the clogged port. Complete utilization of the filter cartridge is therefore ensured.

In the preferred embodiment filter discs 1 are provided with wire reinforcing means 11, which bridge outlet passages 8 as disclosed in the aforementioned Proulx U.S. Pat. No. 3,360,133. Such reinforcing means prevents the occurrence of channeling at the filter discs and consequent failure of the cartridge.

The beneficial features and advantages of the cartridge of the present invention are more readily apparent upon comparison of this cartridge with a prior art cartridge, the inlet portion of which is shown in FIG. 4. That cartridge comprises a plurality of filter discs 21 between which separator discs 22 are disposed. The spacer discs include cut-out portions which, in conjunction with the walls of the adjacent filter discs, form chambers 23, the function of which is identical to that of chambers 5 of the cartridge of FIGS. 1, 2 and 3. In order to permit entry of fluid from the exterior of the cartridge to inlet chambers 23, filter discs 21 are provided with peripheral inlet ports, which register with the inlet passages 25 of the chambers 23. Since the fibrous material from which the separator discs are formed softens and swells upon absorption of water, the separator discs would tend to swell and obstruct inlet ports 24 and thus prevent turbid liquid from entering the filter. However, the illustrated prior art cartridge includes staples 26 which are inserted circumferentially in the separator discs in position to register with inlet ports 24 of the filter discs. These staples restrain the swelling of the separator disc material and prevent its intrusion into the critical fluid inlet areas. Although such staples have been effective in The prevention of blocking of the inlet ports 24 due to the swelling of the separator disc material, the addition of staples to this portion of each filter disc has added to the cost of manufacturing the cartridge. Moreover, if any cooperating pair of inlet ports 24 becomes clogged in any manner, the presence of solid sections 28 of the adjacent separator discs prevents the flow of oily liquid from any other inlet port to the blocked inlet ports.

The filter cartridge of the present invention is less expensive to manufacture than the cartridge disclosed in the aforementioned Wilansky patent since it requires no reinforcements at the inlet ports. Notwithstanding the lack of such reinforcements, the filter cartridge of the present invention performs as well as the cartridge of the Wilansky patent. When the filter and spacer discs are constructed as herein described, incorporating both the reinforcements 11 in the filter discs adjacent the outlet passages of the spacer discs and the slots 9 in the spacer discs adjacent the inlet ports 2, the disruptive type of failure of the cartridge due to water-contaminated oil is effectively prevented even when the pressure drop is permitted to increase to as much as 100 p.s.i. differential.

I claim:

1. A cartridge for filtering oily liquids which are contaminated with entrained immiscible material including water, comprising
  a plurality of filter discs,
  a plurality of spacer discs of foraminous material, each of said spacer discs being interposed between a pair of said filter discs, said spacer discs having circumferentially arranged cut-out portions forming, with the adjacent filter discs, alternately arranged inlet and outlet chambers, said inlet chambers having inlet passages,
  said filter discs having inlet ports registering with said inlet passages, and
  enlarged inlet means adjacent each of said inlet ports for providing an enlarged inlet dimension in a direction parallel to the longitudinal axis of said cartridge, thereby reducing the tendency for the material of said spacer discs adjacent said inlet ports to expand into and clog said inlet ports, the total longitudinal dimension of each of said inlet ports and the respective inlet port means adjacent thereto being the thickness of one of said spacer discs plus the thickness of two of said filter discs.

2. A cartridge in accordance with claim 1 wherein said enlarged inlet means comprises a plurality of radially extending slots in said spacer discs, each of said slots being aligned with said inlet ports of said filter discs.

3. A cartridge in accordance with claim 2 wherein said inlet ports, said inlet passages and said slots are so aligned that they form a linear passage throughout the entire length of said cartridge.

* * * * *